United States Patent
Zhang et al.

(10) Patent No.: US 9,683,604 B2
(45) Date of Patent: Jun. 20, 2017

(54) STRUCTURE AND FABRICATION METHOD OF A MULTILAYER OVERLAY FOR PLAIN BEARINGS

(71) Applicant: DAIDO METAL COMPANY LTD., Nagoya (JP)

(72) Inventors: Yi Zhang, Taunton (GB); Madan Pal, Hambridge (GB); Elena Banchelli, Taunton (GB); Ian Kerr, Ilminster (GB)

(73) Assignee: Daido Metal Company Ltd., Nagoya (JP)

( * ) Notice: Subject to any disclaimer, the term of this patent is extended or adjusted under 35 U.S.C. 154(b) by 70 days.

(21) Appl. No.: 14/742,987

(22) Filed: Jun. 18, 2015

(65) Prior Publication Data
US 2015/0369287 A1    Dec. 24, 2015

(30) Foreign Application Priority Data

Jun. 20, 2014 (GB) .................................. 1411054.8

(51) Int. Cl.
*F16C 33/02* (2006.01)
*F16C 33/12* (2006.01)
(Continued)

(52) U.S. Cl.
CPC ............ *F16C 33/125* (2013.01); *C23C 10/02* (2013.01); *C23C 10/28* (2013.01); *C23C 28/02* (2013.01);
(Continued)

(58) Field of Classification Search
CPC B32B 7/02; B32B 15/00; B32B 15/01; B32B 15/011; B32B 15/012; B32B 15/013; B32B 15/015; B32B 15/016; B32B 15/017; B32B 15/018; B32B 15/02; B32B 15/04; B32B 15/043; B32B 15/046; B32B 15/06; B32B 15/08; B32B 15/082; B32B 15/085;
(Continued)

(56) References Cited

U.S. PATENT DOCUMENTS 6,312,579 B1    11/2001    Bank et al.
6,357,917 B1     3/2002    Lyon et al.
(Continued)

FOREIGN PATENT DOCUMENTS

JP    CA 2686038 A1 *  5/2010  ................ B22F 7/08
WO   WO-2012067735 A1   5/2012

OTHER PUBLICATIONS

Search Report dated Apr. 25, 2015 issued in priority patent application Serial No. GB1411054.8 (one page).

*Primary Examiner* — Phillip A Johnson
(74) *Attorney, Agent, or Firm* — Harness, Dickey & Pierce, PLC

(57) ABSTRACT

Provided is a plain bearing including a backing layer, a bearing metal layer, an optional intermediate layer and an overlay. The overlay includes a plurality of sub-layers disposed one on top of the other, which sub-layers include two or more relatively soft sub-layers and one or more relatively hard sub-layer. The soft and hard sub-layers are arranged alternately with respect to one another. Each soft sub-layer includes a metal or metal alloy, and each hard sub-layer includes one or more intermetallic compound.
A method of making a coated plain bearing is also provided.

36 Claims, 4 Drawing Sheets

(51) Int. Cl.
  *C23C 10/02* (2006.01)
  *C23C 10/28* (2006.01)
  *C23C 28/02* (2006.01)
  *F16C 33/14* (2006.01)
  *C21D 9/40* (2006.01)
  *F16C 17/02* (2006.01)

(52) U.S. Cl.
  CPC ........... *C23C 28/021* (2013.01); *C23C 28/027* (2013.01); *F16C 33/122* (2013.01); *C21D 9/40* (2013.01); *F16C 17/02* (2013.01); *F16C 33/14* (2013.01); *F16C 2223/30* (2013.01)

(58) Field of Classification Search
  CPC ..... B32B 15/088; B32B 15/09; B32B 15/092; B32B 15/095; B32B 15/098; Y10T 428/12014; Y10T 428/12021; Y10T 428/12028; Y10T 428/12146; F16C 33/122; F16C 33/124; F16C 33/125; F16C 33/127; F16C 33/14
  USPC ........ 428/212–213, 215–217, 220, 323, 328, 428/329, 330, 331
  See application file for complete search history.

(56) References Cited

U.S. PATENT DOCUMENTS

| | | | |
|---|---|---|---|
| 6,492,039 | B2 | 12/2002 | Huhn et al. |
| 2002/0068189 | A1* | 6/2002 | Kagohara ............. B32B 15/012 428/653 |
| 2004/0265618 | A1 | 12/2004 | Tsuji et al. |
| 2006/0263625 | A1 | 11/2006 | Adam et al. |
| 2008/0102307 | A1* | 5/2008 | Zidar ...................... B32B 15/01 428/640 |
| 2012/0064365 | A1 | 3/2012 | Takayanagi et al. |
| 2013/0316189 | A1* | 11/2013 | Asakura .................. C25D 5/10 428/642 |
| 2016/0290397 | A1* | 10/2016 | Vieira De Morais ... B32B 15/08 |

* cited by examiner

STRUCTURE AND FABRICATION METHOD OF A MULTILAYER OVERLAY FOR PLAIN BEARINGS

CROSS-REFERENCE TO RELATED APPLICATIONS

This application claims the benefit of priority from Great Britain Patent Application No. 1411054.8 filed on Jun. 20, 2014, the entire disclosure of which is incorporated herein by reference.

FIELD OF THE INVENTION

This invention relates to the structure of a laminated multilayer overlay consisting of a group of soft metallic sub-layers separated by hard intermetallic compound sub-layers for plain bearing applications, especially in internal combustion engines. The invention also relates to the process for manufacturing such sliding overlays. The invention concerns in embodiments sliding elements such as plain bearings of internal combustion engines, comprising a back layer, a bearing lining layer, an intermediate or anti-diffusion layer and a laminated functional multilayer overlay consisting of a group of tin based soft metallic sub-layers separated by hard intermetallic compound sub-layers.

RELATED ART

Sliding elements, such as plain bearings of internal combustion engine, often include a metallic copper or aluminium lining alloy bonded to a steel backing. The copper or aluminium alloys provide a strong surface that can withstand the loads subjected on the sliding element in use. Such sliding elements should also exhibit suitable seizure resistance as well as good embedability and conformability and for this purpose a soft overlay layer is usually added on top of the lining layer, such as lead and lead alloy. Lead has been proved historically as a very reliable overlay material combining the properties mentioned above and also provides reasonable fatigue resistance to external loading.

Due to worldwide environmental and $CO_2$ emission legislations the sliding bearings manufactured with high performance overlays are demanded for launching of new engines especially for downsized engines. This requirement spreads across the whole internal combustion engine industry from passenger car to heavy duty diesel and medium speed diesel for marine and power generation applications. Various approaches have been explored and one possible solution is to segment the overlay into a laminated multilayer structure. The segmented multilayer structure not only reduces the thickness of each individual sub-layer making it stronger in fatigue resistance but also creates a group of sub-layer-sub-layer interfaces which may further enhance the mechanical properties of the overlay.

US6492039B2 describes an additional layer comprising of nickel and tin being applied between tin-copper overlay and nickel diffusion barrier layer. The layer is applied by by an electroplating method and provides wear and seizure protections when the tin-copper overlay is worn out. However this multilayer structure only comprises of two layers. The additional nickel-tin layer is applied between the overlay and the diffusion barrier layer and therefore it offers little improvement in fatigue strength for modern downsized engines. Furthermore because the nickel-tin layer is produced by an electrochemical method this not only complicates the process control but also introduces undesirable internal stresses into the overlay structure making it prone to fatigue attack.

Efforts have been made in US2006/0263625A1 to simplify the plating process control of the overlay as described in US6492039B2. Instead of producing the nickel-tin layer by an electrochemical method US2006/0263625A1 discloses that such layers can be formed by an aging process at high temperatures, and claims good seizure and wear protection when the tin-copper overlay is worn out. Compared with the electrochemical method, the complicated plating process is avoided and any internal stresses are relieved during the aging process. However such an overlay still lacks the capacity to provide improved fatigue resistance to cope with modern high performance engines. This is thought to be due to the fact that the overlay comprises only two sub-layers which limits any further enhancements of the fatigue properties.

US6357917B1 describes a multilayer structure having a top flash layer comprising one of: iron, chromium, nickel, cobalt, gold, silver and copper, deposited on a bottom overlay layer. The bottom overlay layer comprises of one of: lead, tin, indium, copper, nickel, zinc and antimony material. The top flash layer is then heated to a predetermined temperature (of 160° C.) for a predetermined period of time to react with the bottom overlay layer to form an intermetallic or solid solution layer at desired rate which is claimed to be hard and wear resistant. This structure is again unable to significantly increase the fatigue performance of the overlay due to the fact that the overlay comprises of only two sub-layers. Also because a hard intermetallic or solid solution layer is formed on top of the overlay, this may compromise the embedability and conformability of the bearing especially during the period of engine running in.

US6312579B1 describes a multilayer material with alternating hard-soft layers to enhance the overlay properties. The lead-free multilayer overplate is produced on a base lining member. The overplate includes at least two distinct lead-free layers electroplated at different current densities from the same bath to provide the multiple lead-free overplate layers with different deposited characteristics. However as the multilayer material is created by an electroplating method from the same bath the variation between layers and hence the performance of the multilayer overlay structure is limited. Furthermore the internal stress associated with the plating process may become an issue. No further details with regard to the number, the location, the thickness and the arrangement of each individual sub-layers is provided in US6312579B1.

SUMMARY OF THE INVENTION

It an object of the present invention to provide a multilayer overlay structure for a sliding element, for example the plain bearing of an internal combustion engine, which exhibits one or more of: excellent fatigue and wear resistance, good seizure performance and other necessary properties for various modern internal combustion engine applications. Preferably the sliding element exhibits all of these properties.

It is also an object of the present invention to provide a manufacturing method with which it is possible to produce a multilayer overlay having a dynamic structure without complicating the production process, thereby reducing manufacturing cost. It is also desirable to reduce or remove internal stresses generated during deposition of the overlay.

The object of the invention is achieved by a sliding element, in particular for plain bearings, exhibiting a back layer, a bearing metal layer of a copper alloy or an aluminium alloy, an intermediate layer and an overlay, wherein the overlay comprises a group of soft metallic sub-layers separated by hard intermetallic compound sub-layers manufactured by the conventional coating methods followed by thermal processing.

The object of the invention is further achieved by the overlay in which the innermost layer and outermost layer are both soft metallic sub-layers and the rest is being dynamically arranged at different positions between innermost layer and outermost layer with varied individual thicknesses to suit modern internal combustion engine with different performance requirements.

According to the present invention the hard intermetallic compound sub-layers segment the overlay into three or more thinner layers therefore a laminated multilayer overlay structure is created. The laminated overlay structure improves the fatigue performance of the original thick overlay to a certain extend depends on the number and the location of each individual sub-layers therefore the structure of the multilayer overlay can be made to suit the requirements of each engine application. The improvement in fatigue is achieved by the much reduced accumulation of plastics deformations under external loading associated with the shorter progression route of thinner layer and as a result the multilayer is less prone to fatigue attack.

For engines where high fatigue resistance is required and the embedability and conformability are less a concern the multilayer overlay may be arranged as a group of soft metallic sub-layers separated by hard intermetallic compound sub-layers. The number of the soft metallic sub-layers is typically no less than three and the number of hard intermetallic compound sub-layers is typically no less than two. Therefore the number of the sub-layers in total is typically no less than five. The thickness of each individual sub-layer may be is identical in the range between 0.5 μm and 8 μm preferably 1 μm to 3 μm. Such a multilayer overlay exhibits exceptional fatigue strength due to the much reduced sub-layer thickness and the increased number the hard-soft interfaces. The wear resistance also showed significant improvements as a result of the increased number of hard intermetallic compound sub-layers and hard-soft interfaces.

For engines where the requirements for a plain bearing combines high fatigue strength and wear resistance as well as good protection against abrasive damage by foreign particles, the design of the multilayer overlay becomes a compromise to accommodate the required properties. Therefore the overlay is arranged as a group of soft metallic sub-layers separated by hard intermetallic compound sub-layers. The number of the soft metallic sub-layers is typically no less than three and the number of hard intermetallic compound sub-layers is typically no less than two. Therefore the number of sub-layers in total is typically no less than five. The thickness of the soft metallic sub-layers is different to that of hard intermetallic compound sub-layers with soft metallic sub-layers being slightly thicker than hard intermetallic compound sub-layers. The thickness of each soft metallic sub-layer is in the range of 1 μm to 10 μm, preferably 2 μm to 4 μm whilst the thickness of each hard intermetallic sub-layer is from 0.1 μm to 5 μm, preferably 0.5 μm to 2 μm. This structural arrangement takes advantages of much reduced sub-layer thickness and the increased number of hard-soft interfaces therefore provides excellent properties for engines which require high fatigue strength and wear resistance whilst maintaining the good embedability and conformability offered by the thicker soft metallic sub-layers when they are exposed to a steel shaft counterpart.

For engines where the bearing is prone to embedability and conformability damages whilst the fatigue requirement is modest the overlay may be arranged that the total number of sub-layers is no more than 5 and the soft metallic sub-layer is considerably thicker than the hard intermetallic sub-layer. The thickness of each soft metallic sub-layer is in the range of 1 μm to 30 μm, preferably 5 μm to 10 μm whilst the thickness of each hard intermetallic sub-layer is from 0.1 μm to 8 μm, preferably 2 μm to 5 μm. This structural arrangement provides excellent embedability, conformability and other required soft protection for engines and at the same time a reasonable fatigue strength and wear resistance are still achieved by the application of hard intermetallic compound sub-layers and thinner soft metallic sub-layers as well as hard-soft interfaces. Furthermore in order to achieve the maximum benefit of the multilayer overlay structure the outermost hard intermetallic sub-layer may be arranged at the bottom half of the overlay for engines requires further enhancement of the soft properties whilst the hard intermetallic sub-layer may be alternatively manufactured at the centre line or the top half of the overlay to provide early wear protection.

The soft metallic sub-layers in one overlay structure can be same or different in composition may comprise at least one of tin, bismuth, lead, silver, indium, gold, antimony, aluminium and alloys thereof and are applied by any conventional coating methods.

The soft metallic sub-layers may also include one or more soft particles selected from the group consisting of PTFE, fluorinated polymers, metal sulphides, metal fluorides, metal sulphates, graphite and other soft carbonaceous particles, hexagonal boron nitride, phyllosilicates, titanium oxide, zinc oxide and lead oxide, and other particles that may present hexagonal structures.

The soft metallic sub-layers may also include one or more hard particles selected from the group consisting of metal oxides, borides, carbides, nitrides, sulphates and silicides, diamond, carbon nanotubes, graphene and other hard carbonaceous particles, and other particles that may present cubic structures.

The hard intermetallic sub-layers in one overlay structure can be same or different in composition and may be created by applying a metallic layer using any conventional coating method then followed by thermal processing involving at least two elements with one of them from group of tin, bismuth, lead, silver, indium, gold, antimony, aluminium. The other one or more element is selected from group comprising nickel, cobalt, zinc, silver, iron, copper, chromium, cadmium, aluminium.

The hard intermetallic sub-layer may also include one or more soft particles selected from the group consisting of PTFE, fluorinated polymers, metal sulphides, metal fluorides, metal sulphates, graphite and other soft carbonaceous particles, hexagonal boron nitride, phyllosilicates, titanium oxide, zinc oxide and lead oxide, and other particles that may present hexagonal structures.

The hard intermetallic sub-layer may also include one or more hard particles selected from the group consisting of metal oxides, borides, carbides, nitrides, sulphates and silicides, diamond, carbon nanotubes, graphene and other hard carbonaceous particles, and other particles that may present cubic structures.

The thermal process is advantageously carried out at the temperature between 100° C. and 250° C., preferably 150° C. and 180° C. Higher temperatures may change the crystal structure of the soft metallic sub-layer therefore affect its tribological performance and lower thermal diffusion temperature prolongs the treatment time hence increases the production cost.

The time of thermal diffusion process is advantageously between 2 hrs and 60 hrs preferably 12-36 hrs depend on the constitution of the overlay. Longer time provides no further benefit and shorter time is not adequate to form the required hard intermetallic compound sub-layer and release the internal stress in the overlay.

According to the present invention by the application of thermal diffusion process complicated chemical process control is avoided and harmful internal stresses are relieved which consequently improves the quality control and product performance.

According to the present invention the innermost layer and outermost layer of the overlay are both soft metallic sub-layers. The outmost sub-layer provides required running-in properties whilst the innermost layer enhances the adhesion between the overlay and the diffusion barrier layer.

The overall thickness of the overlay according to the present invention is advantageously from 5 μm to 50 μm.

DETAILED DESCRIPTION OF THE EMBODIMENTS

Figure 1:
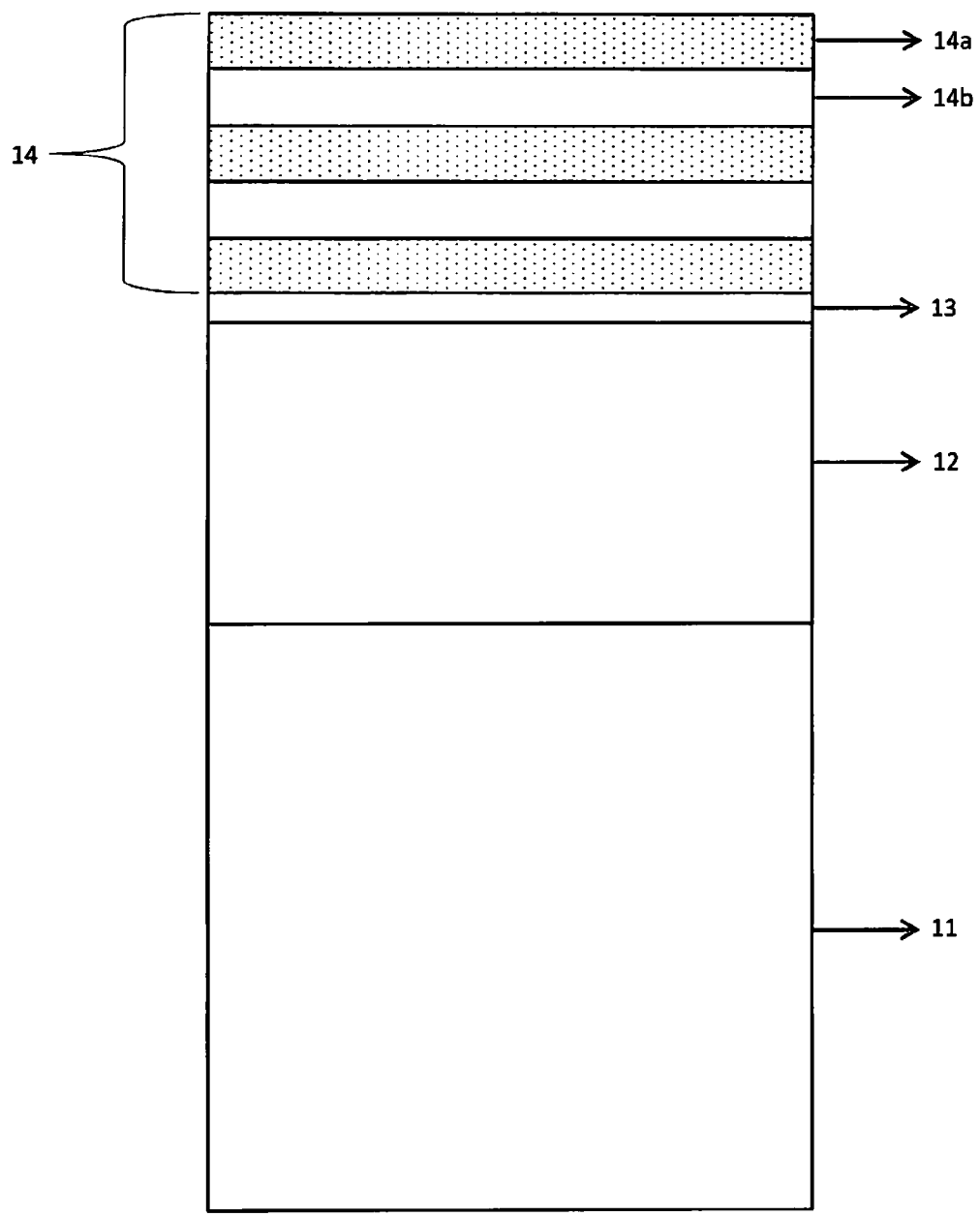
FIG. 1 shows a cross-section of a preferred embodiment of a sliding bearing for engines where high fatigue resistance is required according to the present invention.

Referring to FIG. 1 which shows a cross-section of a preferred embodiment of a sliding bearing for engines where high fatigue resistance is required according to the present invention. The bearing comprising a strong backing 11, a lining metal layer bonded to the backing 12, an intermediate layer or diffusion barrier layer 13, and an overlay layer 14. The backing layer 11 may be steel or any other suitable materials such as bronze or aluminium alloy. The lining metal layer 12 may be any suitable materials but in practical use is either copper based alloy or aluminium based alloy. The intermediate layer 13 comprises at least one from the group of nickel, cobalt, iron, copper, chrome, zinc, aluminium and alloys thereof and is applied by any conventional coating method. The thickness of the intermediate layer generally lies in the range between 1 μm to 5 μm. The multilayer overlay 14 comprises five sub-layers of equal thickness with three soft metallic sub-layers 14a separated by two hard intermetallic compound sub-layers 14b which provide required protections for engines where high fatigue resistance is required. The multilayer structure is manufactured by conventional coating methods followed by thermal processing. The overall thickness of the overlay is in the range between 5 μm to 50 μm.

Figure 2:
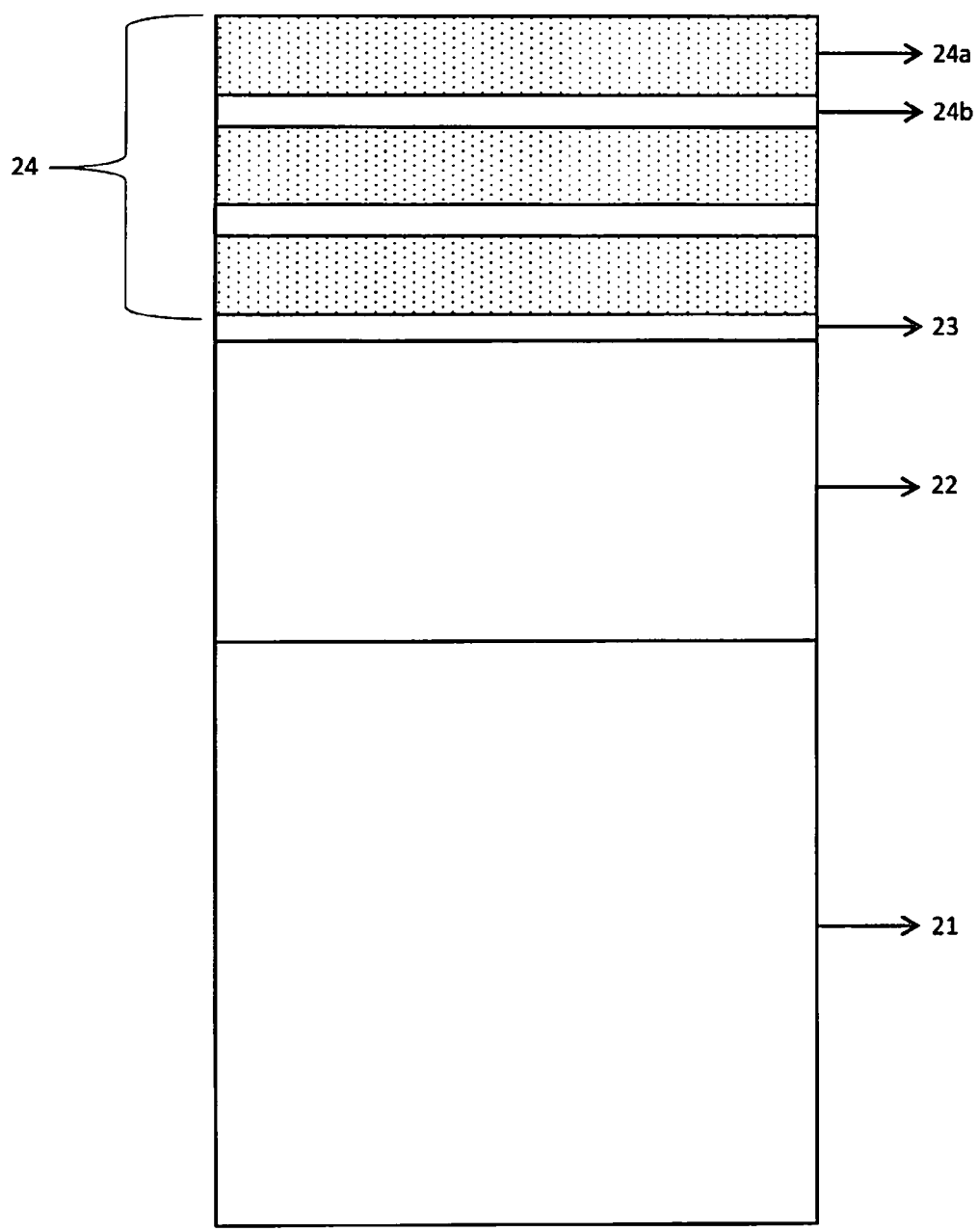
FIG. 2 shows a cross-section of a preferred embodiment of a sliding bearing for engines where the requirements for plain bearings combines high fatigue strength and wear resistance as well as good protections against foreign particles abrasive damages according to the present invention.

FIG. 2 shows a cross-section of a preferred embodiment of a sliding bearing for engines where the requirements for plain bearings combines high fatigue strength and wear resistance as well as good protections against foreign particles abrasive damages according to the present invention. The bearing comprising a strong backing 21, a lining metal layer bonded to the backing 22, an intermediate layer or diffusion barrier layer 23, and an overlay layer 24. The backing layer 21 may be steel or any other suitable materials such as bronze or aluminium alloy. The lining metal layer 22 may be any suitable materials but in practical use is either copper based alloy or aluminium based alloy. The intermediate layer 23 comprises at least one from the group of nickel, cobalt, iron, copper, chrome, zinc, aluminium and alloys thereof and is applied by any conventional coating method. The thickness of the intermediate layer generally lies in the range between 1 μm to 5 μm. The multilayer overlay 24 comprises five sub-layers of unequal thickness with three thicker soft metallic sub-layers 24a separated by two thinner hard intermetallic compound sub-layers 24b. Such an arranged multilayer structure provides good embedability for engines and at the same time doesn't significantly compromise the high fatigue resistance in relation to FIG. 1. The multilayer structure is manufactured by conventional coating methods followed by thermal processing. The overall thickness of the overlay is in the range between 5 μm to 50 μm.

Figure 3:
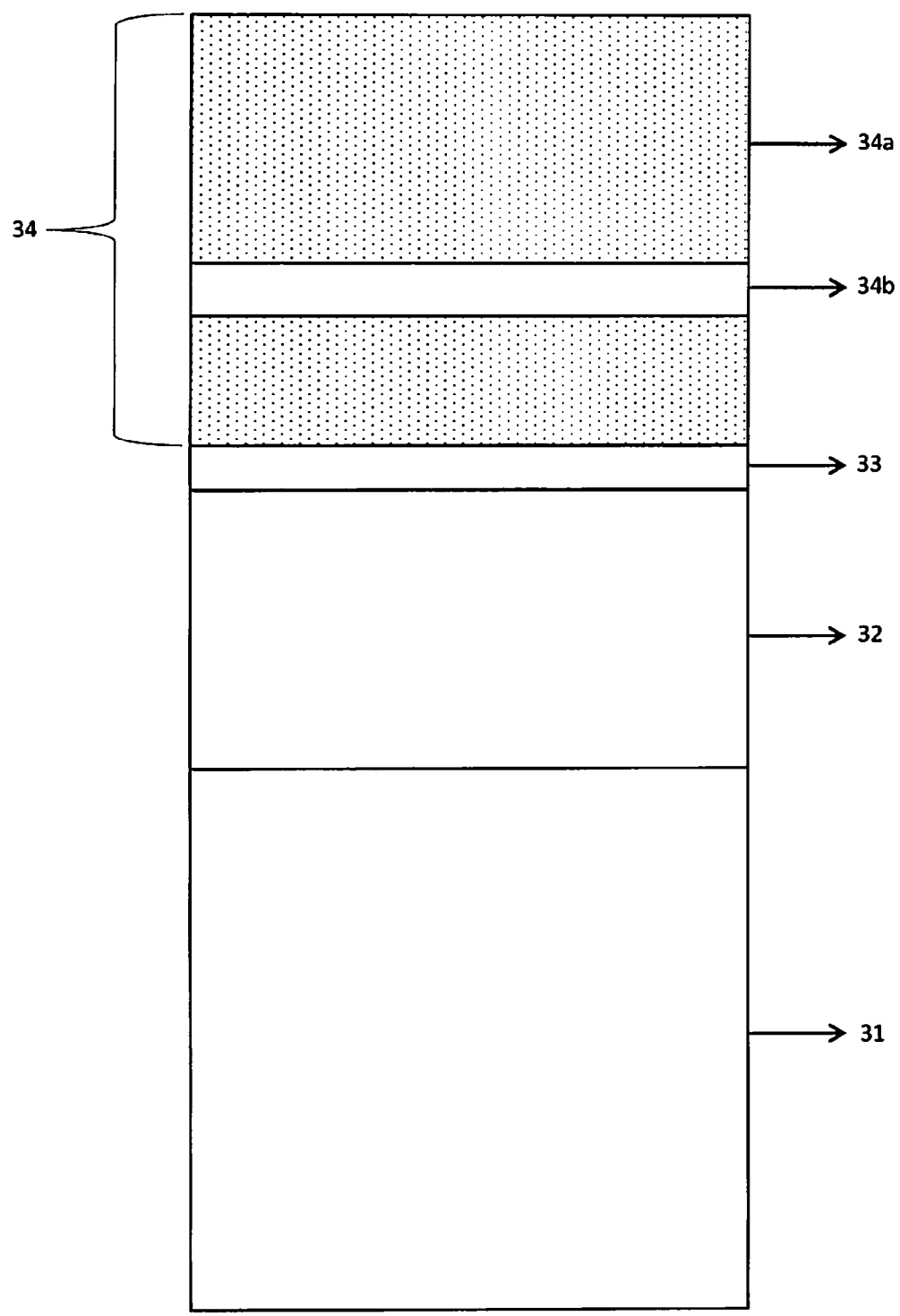
FIG. 3 shows a cross-section of a preferred embodiment of a sliding bearing for engines where the bearing is prone to embedability and conformability damages whilst the fatigue requirement is modest according to the present invention.

FIG. 3 shows a cross-section of a preferred embodiment of a sliding bearing for engines where the bearing is prone to embedability and conformability damages whilst the fatigue requirement is modest according to the present invention. The bearing comprising a strong backing 31, a lining metal layer bonded to the backing 32, an intermediate layer or diffusion barrier layer 33, and an overlay layer 34. The backing layer 31 may be steel or any other suitable materials such as bronze or aluminium alloy. The lining metal layer 32 may be any suitable materials but in practical use is either copper based alloy or aluminium based alloy. The intermediate layer 33 comprises at least one from the group of nickel, cobalt, iron, copper, chrome, zinc, aluminium and alloys thereof and is applied by any conventional coating method. The thickness of the intermediate layer generally lies in the range between 1 μm to 5 μm. In the embodiment of the FIG. 3 the multilayer overlay 34 is comprised of three sub-layers with two soft metallic sub-layers 34a separated by a hard intermetallic compound sub-layer 34b. The hard intermetallic compound sub-layer is at the bottom half of the overlay which subsequently make the outmost soft metallic sub-layer the thickest one in the overlay structure therefore provides excellent soft protection for engines with such a requirement. The multilayer structure is manufactured by conventional coating methods followed by thermal processing. The overall thickness of the overlay is in the range between 5 μm to 50 μm.

Figure 4:
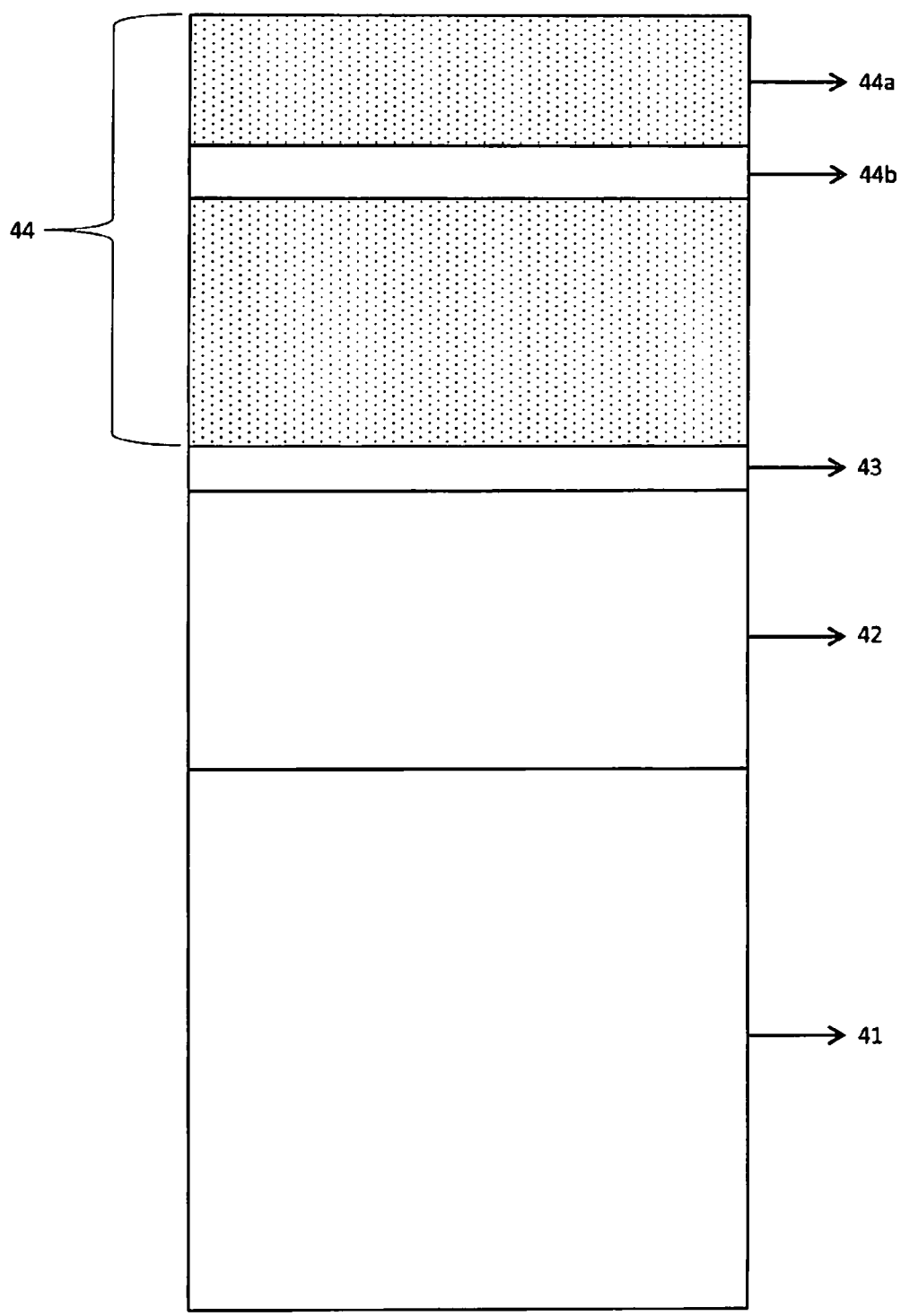
FIG. 4 shows a cross-section of an alternative preferred embodiment of a sliding bearing for engines where the bearing is prone to embedability and conformability damages whilst the fatigue requirement is modest according to the present invention.

FIG. 4 shows a cross-section of an alternative preferred embodiment of a sliding bearing for engines where the bearing is prone to embedability and conformability damages whilst the fatigue requirement is modest according to the present invention. The bearing comprising a strong backing 41, a lining metal layer bonded to the backing 42, an intermediate layer or diffusion barrier layer 43, and an overlay layer 44. The backing layer 41 may be steel or any other suitable materials such as bronze or aluminium alloy. The lining metal layer 42 may be any suitable materials but in practical use is either copper based alloy or aluminium based alloy. The intermediate layer 43 comprises at least one from the group of nickel, cobalt, iron, copper, chrome, zinc, aluminium and alloys thereof and is applied by any conventional coating methods. The thickness of the intermediate layer generally lies in the range between 1 μm to 5 μm. In the embodiment of the FIG. 4 the multilayer overlay 44 is comprised of three sub-layers with two soft metallic sub-layers 44a separated by a hard intermetallic compound sub-layer 44b. In contrast to FIG. 3 the hard intermetallic compound sub-layer is arranged at the centre line or top half of the overlay therefore offers enhanced hard properties at the early stage of the engines operation having such requirement. The multilayer structure is manufactured by conventional coating methods followed by thermal processing. The overall thickness of the overlay is in the range between 5 μm to 50 μm.

Example 1

This example is a sliding bearing having a structure in accordance with FIG. 1. A 25 micron thick coating 14 was made up of three soft metallic sub-layers (14a) separated by two hard intermetallic compound sub-layers (14b). These were coated onto an intermediate layer 13 which is itself deposited on an Al alloy bearing metal lining metal layer 12, which is bonded onto a steel backing layer 11.

The soft metallic layers were made of pure tin deposited by a PVD process. The hard intermetallic compound layers were made by initially depositing corresponding layers of metallic nickel by PVD. The sub-layers were of course deposited alternately. The thickness of each deposited layer is given in the table.

The sliding bearing was then placed in an oven for heat treatment of the sub-layers of the coating at 150 degrees C. for 24 hours. During heat treatment tin atoms migrated into the nickel layers to form hard intermetallic compounds. The composition of the resulting coating sub-layers is shown in table 1 below. As can be seen in the table, the hardness of the intermetallic sub-layers (2 and 4) is considerably higher than that of the tin layers (1,3,5).

TABLE 1

| FIG. 1 | Sub-Layer | Material | Thickness As Deposited | Thickness After Heat Treatment | Hardness Hv |
|---|---|---|---|---|---|
| 14a | 1 (Top) | Sn | 6 μm | 5 μm | 20-25 |
| 14b | 2 | Sn[4]Ni[3] | 3 μm | 5 μm | 450-550 |
| 14a | 3 | Sn | 7 μm | 5 μm | 20-25 |
| 14b | 4 | Sn[4]Ni[3] | 3 μm | 5 μm | 450-550 |
| 14a | 5 | Sn | 6 μm | 5 μm | 20-25 |

Example 2

As with Example 1, this is a sliding bearing. In this example sub-layers were deposited onto an intermediate layer 23, which has itself been deposited on an Al alloy bearing metal lining layer 22 (in FIG. 2), which is bonded to a steel backing layer 21.

A 30 micron thick coating was made up of three soft metallic layers separated by two hard intermetallic compound layers. The soft metallic sub-layers were made of pure tin with 2% w/w of titanium dioxide particles (500 nm particle size) deposited by an electroplating process.

The hard intermetallic compound sub-layers were made by depositing layers of metallic nickel containing 1.5% v/v of PTFE particles (0.5 micron particle size). The deposited thicknesses are given in Table 2 below. The deposited structure was then heat treated by placing the sliding bearing into an oven and then heat treating the coating at 150 degrees C. for 24 hours. The composition of the resulting coating is shown in table 2, along with the sub-layer thicknesses after heat treatment.

TABLE 2

| FIG. 2 | Sub-Layer | Material | Thickness As Deposited | Thickness After Heat Treatment | Hardness Hv |
|---|---|---|---|---|---|
| 24a | 1 (Top) | Sn/TiO2 | 9 μm | 8 μm | 15-20 |
| 24b | 2 | Sn[4]Ni[3]/PTFE | 1 μm | 3 μm | 360-400 |
| 24a | 3 | Sn/TiO2 | 10 μm | 8 μm | 15-20 |
| 24b | 4 | Sn[4]Ni[3]/PTFE | 1 μm | 3 μm | 360-400 |
| 24a | 5 | Sn/TiO2 | 9 μm | 8 μm | 15-20 |

Example 3

In this example a plain bearing having the following sub-layer arrangement was made. A 25 micron thick coating 34 was made up of two soft metallic sub-layers 34a separated by one hard intermetallic compound sub-layer 34b. The soft metallic sub-layers were made of a tin silver alloy deposited by an electroplating process. The deposited thicknesses are given in Table 3 below.

The hard intermetallic compound sub-layer was made by depositing a layer of metallic nickel containing 1% v/v of WS[2] particles (1 micron particle size) and then heat treating the sub-layer coating by placing the sliding bearing in an oven at 160 degrees C. for 36 hours. The composition of the resulting coating is shown in Table 3, along with the final sub-layer thicknesses after treatment.

TABLE 3

| FIG. 3 | Sub-Layer | Material | Thickness As Deposited | Thickness After Heat Treatment | Hardness Hv |
|---|---|---|---|---|---|
| 34a | 1 | SnAg | 15 μm | 14 μm | 15-20 |
| 34b | 2 | Sn[4]Ni[3]/WS2 | 2 μm | 4 μm | 360-400 |
| 34a | 3 | SnAg | 8 μm | 7 μm | 15-20 |

Example 4

In this example a plain bearing having the following sub-layer arrangement was made. A 20 micron thick coating 44 on an intermediate layer 43 was made up of two soft metallic sub-layers 44a separated by one hard intermetallic compound sub-layer 44b. The soft metallic sub-layers were made of a tin copper alloy deposited by an electroplating process.

The hard intermetallic compound sub-layers were made by depositing layers of metallic nickel, also by electroplating. The sliding bearing was then placed in an oven so as to heat treat the coating at 170 degrees C. for 36 hours. The composition and thickness of the resulting sub-layers are shown in Table 4 below. The hard intermetallic compound layer is a mixture of SnNi and SnNiCu intermetallic compounds.

TABLE 4

| FIG. 4 | Sub-Layer | Material | Thickness As Deposited | Thickness After Heat Treatment | Hardness Hv |
|---|---|---|---|---|---|
| 44a | 1 | SnCu | 7 μm | 6 μm | 12-18 |
| 44b | 2 | Sn5(CuNi)6 + Ni3Sn4 | 2 μm | 4 μm | 500-550 |
| 44a | 3 | SnCu | 11 μm | 10 μm | 12-18 |

The present invention provides a coating for sliding bearings in which hard intermetallic layers are developed by diffusion during heat treatment rather than by complicated alloying or chemical processes during deposition. The outer/top sub-layer provides protection during running in of an engine. The innermost (intermediate layer-interfacing) sub-layer provides a good bond with the bearing lining layer. The hard layers provide mechanical strength and Poisson constraint and help ensure the integrity of the coating.

The invention claimed is:

1. A plain bearing comprising a backing layer, a bearing metal layer, an optional intermediate layer and an overlay, wherein the overlay comprises a plurality of sub-layers disposed one on top of the other, which sub-layers comprise two or more relatively soft sub-layers and one or more relatively hard sub-layer, wherein the soft and hard sub-layers are arranged alternately with respect to one another, each soft sub-layer comprising a metal or metal alloy, and each hard sub-layer comprising one or more intermetallic compound.

2. The plain bearing according to claim 1 wherein one soft sub-layer is an inner sub-layer disposed adjacent the bearing metal layer, or intermediate layer when present.

3. The plain bearing according to claim 2 wherein another soft sub-layer is an outer sub-layer which provides an outside surface of the bearing.

4. The plain bearing according to claim 1 wherein the intermetallic compound of the hard sub-layer comprises metal atoms which are the same element as a metal comprised in the soft sub-layer.

5. The plain bearing according to claim 1 wherein the number of said soft sub-layers is no less than three and the number of said hard sub-layers is no less than two whereby the total number of sub-layers in the overlay is no less than five.

6. The plain bearing according to claim 1 wherein the thickness of every individual sub-layer is substantially identical.

7. The plain bearing according to claim 6 wherein each of the sub-layers has common thickness selected from within the range between 0.5 μm and 3.0 μm.

8. The plain bearing according to claim 7 wherein each of the sub-layers has a thickness of between 1.0 μm to 2 μm.

9. The plain bearing according to claim 1 wherein the thickness of each of the soft sub-layers is different than that of each of the hard sub-layers, with the thickness of each of the soft metallic sub-layers being greater than that of each of the hard sub-layers.

10. The plain bearing according to claim 9 wherein the thickness of each soft sub-layer is in the range of 1.0 μm to 10 μm whilst the thickness of each hard sub-layer is from 0.1 μm to 5 μm.

11. The plain bearing according to claim 10 wherein the thickness of each soft sub-layer is in the range 2.0 μm to 4.0 μm whilst the thickness of each hard sub-layer is 0.5 μm to 2.0 μm.

12. The plain bearing according to claim 1 wherein the overlay is arranged so that the total number of sub-layers is no more than 5 and each soft sub-layer is thicker than each hard intermetallic sub-layer.

13. The plain bearing according to claim 12 wherein the thickness of each soft sub-layer is in the range of 1.0 μm to 30 μm whilst the thickness of the hard sub-layer is from 0.1 μm to 8.0 μm.

14. The plain bearing according to claim 13 wherein the thickness of each soft sub-layer is in the range 5.0 μm to 10 μm whilst the thickness of each hard sub-layer is in the range 2.0 μm to 5.0 μm.

15. The plain bearing according to claim 12 wherein each soft sub-layer has a thickness which is at least twice the thickness of each hard sub-layer.

16. The plain bearing according to claim 1 wherein an outermost hard sub-layer is disposed at a bottom half of the overlay.

17. The plain bearing according to claim 1 wherein an outermost hard sub-layer is disposed at a center line or a top half of the overlay.

18. The plain bearing according to claim 1 wherein the soft sub-layers are the same or different in composition and each comprise at least one of: tin, bismuth, lead, silver, indium, gold, antimony, aluminium and alloys thereof.

19. The plain bearing according to claim 18 wherein only the hard sub-layers are provided with hard particles.

20. The plain bearing according to claim 18 wherein only the soft sub-layers are provided with hard particles.

21. The plain bearing according to claim 1 wherein one or more of the hard sub-layers and the soft sub-layers further comprise a dispersion of one or more sets of soft particles selected from the group consisting of: PTFE, fluorinated polymers, metal sulphides, metal fluorides, metal sulphates, graphite and other soft carbonaceous particles, hexagonal boron nitride, phyllosilicates, titanium oxide, zinc oxide and lead oxide.

22. The plain bearing according to claim 1 wherein one or more of the hard sub-layers and the soft sub-layers further comprise a dispersion of one or more sets of relatively soft particles having a Mohr hardness less than or equal to 5.

23. The plain bearing according to claim 1 wherein one or more of the hard sub-layers and the soft sub-layers further comprise a dispersion of one or more sets of hard particles selected from the group consisting of: metal oxides, borides, carbides, nitrides, sulphates and silicides, diamond, carbon nanotubes, graphene and other hard carbonaceous particles.

24. The plain bearing according to claim 1 wherein the one or more of the hard sub-layers and the soft sub-layers further comprise a dispersion of one or more sets of particles having a Mohrs hardness greater than or equal to 5, preferably greater than or equal to 5.5.

25. The plain bearing according to claim 1 wherein each hard sub-layer is of the same intermetallic composition as the hard sub-layers.

26. The plain bearing according to claim 1 wherein at least one hard sub-layer has a different intermetallic composition from the other hard sub-layers.

27. The plain bearing according to claim 1 wherein the hard sub-layer comprises an intermetallic compound comprising at least two metallic elements, with at least one of them selected from the group of: tin, bismuth, lead, silver, indium, gold, antimony, aluminium, and at least one other element being selected from the group comprising: nickel, cobalt, zinc, silver, iron, copper, chromium, cadmium, aluminium.

28. The plain bearing according to claim 1 wherein the bearing metal layer is either a copper-based alloy or an aluminium-based alloy.

29. The plain bearing according to claim 1 wherein the intermediate layer is present and comprises at least one from the group of nickel, cobalt, iron, copper, chrome, zinc, aluminium and alloys thereof.

30. The plain bearing according to claim 1 wherein the intermediate layer is present and has a thickness in the range between 1 µm to 5 µm.

31. The plain bearing according to claim 1 wherein an overall thickness of the overlay is from 5 µm to 50 µm.

32. A method of making a coated plain bearing comprising providing a backing layer with a bearing lining layer bonded thereon, optionally depositing an intermediate layer on the bearing lining layer, depositing a sub-layer of a first metal or metal alloy layer on the lining or intermediate layer, depositing a sub-layer of a second metal or metal alloy layer on the first sub-layer, depositing a further sub-layer of the first metal or metal alloy on the second sub-layer, and optionally depositing further alternate first and second metal or metal alloy sub-layers thereon, heat treating the deposited sub-layers to a temperature which permits diffusion of metal atoms in the first metal or metal alloy sub-layers, which atoms migrate into the second metal or metal alloy layers and react therewith to form one or more intermetallic compounds within the second metal or metal alloy, thereby to form a coated overlay made up of relatively soft sub-layers comprising the first metal or metal alloy alternating with relatively hard sub-layers comprising one or more intermetallic compounds.

33. The method according to claim 32 wherein the heat treatment process is carried out for between 2 hrs and 60 hrs.

34. The method according to claim 32 wherein the heat treatment temperature is from 100 to 250 degrees C.

35. The method according to claim 32 wherein the heat treatment process is carried out for between 12 hrs and 36 hrs.

36. The method according to claim 32 wherein the heat treatment temperature is from 140 to 180 degrees C.

* * * * *